US012768676B2

(12) United States Patent
Kuwahara

(10) Patent No.: US 12,768,676 B2
(45) Date of Patent: Oct. 20, 2026

(54) OPTICAL MODULE FOR ENCODER, ENCODER, AND METHOD FOR MANUFACTURING OPTICAL MODULE FOR ENCODER

(71) Applicant: HAMAMATSU PHOTONICS K.K., Hamamatsu (JP)

(72) Inventor: Yosuke Kuwahara, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 64 days.

(21) Appl. No.: 18/848,216

(22) PCT Filed: Feb. 6, 2023

(86) PCT No.: PCT/JP2023/003862
§ 371 (c)(1),
(2) Date: Sep. 18, 2024

(87) PCT Pub. No.: WO2023/181669
PCT Pub. Date: Sep. 28, 2023

(65) Prior Publication Data
US 2025/0207952 A1 Jun. 26, 2025

(30) Foreign Application Priority Data
Mar. 25, 2022 (JP) ................................ 2022-050209

(51) Int. Cl.
*G01D 5/347* (2006.01)

(52) U.S. Cl.
CPC .................................. *G01D 5/3473* (2013.01)

(58) Field of Classification Search
CPC ............................ G01D 5/347; G01D 5/3473
See application file for complete search history.

(56) References Cited

U.S. PATENT DOCUMENTS

2006/0145077 A1* 7/2006 Kim ...................... H10F 39/802 257/E27.131
2012/0228512 A1* 9/2012 van Arendonk ...... G01T 1/2006 250/368
2016/0225809 A1* 8/2016 Vittu .................... H10F 39/024

FOREIGN PATENT DOCUMENTS

GB 2632578 A 2/2025
JP H10-293015 A 11/1998

(Continued)

OTHER PUBLICATIONS

Office Action dated Sep. 25, 2025 from counterpart GB patent application No. 2415287.8.

(Continued)

*Primary Examiner* — Thanh Luu
(74) *Attorney, Agent, or Firm* — Faegre Drinker Biddle & Reath LLP

(57) ABSTRACT

An optical module includes: a support having a bottom wall part; a light receiving element disposed on a surface of the bottom wall part with a light receiving surface facing a side opposite to the bottom wall part; an FOP having an input surface and an output surface and disposed on the light receiving element with the output surface facing the light receiving surface; a first resin member disposed between the light receiving surface and the output surface and bonding the FOP to the light receiving element; and a second resin member disposed on the surface of the bottom wall part so as to be in contact with the light receiving element and the FOP. A material for the first resin member and a material for the second resin member are different from each other.

28 Claims, 6 Drawing Sheets

(56) References Cited

FOREIGN PATENT DOCUMENTS

| | | | |
|---|---|---|---|
| JP | 2002-277326 | A | 9/2002 |
| JP | 2015-007581 | A | 1/2015 |
| JP | 2019-211360 | A | 12/2019 |
| JP | 2021-124308 | A | 8/2021 |
| WO | WO-2018/220958 | A1 | 12/2018 |
| WO | WO-2019/162998 | A1 | 8/2019 |
| WO | 2020/012776 | A1 | 1/2020 |

OTHER PUBLICATIONS

International Preliminary Report on Patentability mailed Oct. 10, 2024 for PCT/JP2023/003862.

* cited by examiner (a)

(b)

OPTICAL MODULE FOR ENCODER, ENCODER, AND METHOD FOR MANUFACTURING OPTICAL MODULE FOR ENCODER

TECHNICAL FIELD

One aspect of the present disclosure relates to an optical module for an encoder, an encoder, and a method for manufacturing an optical module for an encoder.

BACKGROUND ART

Patent Literature 1 describes an optical encoder. In this encoder, a fiber optical plate is disposed on a light receiving element, light emitted from a light emitting element and reflected by a rotary plate passes through the fiber optical plate and is incident on the light receiving element.

CITATION LIST

Patent Literature

Patent Literature 1: Japanese Unexamined Patent Publication No. 2019-211360

SUMMARY OF INVENTION

Technical Problem

There is a case where the encoder as described above is required to have various kinds of performance of, for example, improving detection accuracy or stably disposing the fiber optical plate on the light receiving element, and it is required to realize a design according to the required performance.

An object of one aspect of the present disclosure is to provide an optical module for an encoder, an encoder, and a method for manufacturing such an optical module for an encoder, which can realize a design according to required performance.

Solution to Problem

An optical module for an encoder according to one aspect of the present disclosure includes: a support including a bottom wall part; a light receiving element including a light receiving surface and disposed on a surface of the bottom wall part with the light receiving surface facing a side opposite to the bottom wall part; a fiber optical plate including an input surface constituted by surfaces of one end of a plurality of optical fibers and an output surface constituted by surfaces of the other end of the plurality of optical fibers and disposed on the light receiving element with the output surface facing the light receiving surface; a first resin member disposed between the light receiving surface and the output surface and configured to bond the fiber optical plate to the light receiving element; and a second resin member disposed on the surface of the bottom wall part so as to be in contact with the light receiving element and the fiber optical plate, in which a material for the first resin member and a material for the second resin member are different from each other.

This optical module for an encoder includes a first resin member disposed between the light receiving surface of the light receiving element and the output surface of the fiber optical plate and bonding the fiber optical plate to the light receiving element, and a second resin member disposed on the surface of the bottom wall part so as to be in contact with the light receiving element and the fiber optical plate. Thereby, the fiber optical plate can be firmly bonded to the light receiving element by the first resin member, and the fiber optical plate and the light receiving element can be reliably supported by the second resin member. Furthermore, a material for the first resin member and a material for the second resin member are different from each other. Thereby, the degree of freedom in material selection of the first resin member and the second resin member can be increased, and as a result, a design according to required performance can be realized. For example, the first resin member can be formed from a material having a high light transmittance, and the second resin member can be formed from a material having a low light transmittance. In this case, noise light from the side toward the light receiving element can be blocked by the second resin member while suppressing light from the fiber optical plate toward the light receiving element from being blocked by the first resin member. As a result, the detection accuracy can be improved. As another example, the first resin member can also be formed from a soft material, and the second resin member can also be formed from a hard material. In this case, the fiber optical plate and the light receiving element can be more reliably supported by the second resin member while suppressing the occurrence of peeling between the fiber optical plate and the light receiving element bonded by the first resin member. As a result, the fiber optical plate can be stably disposed on the light receiving element. As described above, according to this optical module for an encoder, a design according to required performance can be realized.

The optical module for an encoder may further include a wire connected to the bottom wall part and the light receiving element, and the second resin member may cover the wire. In this case, the wire can be protected from oil scattered when the encoder is used, physical external force, and the like.

A peripheral edge part of the surface of the bottom wall part may be exposed from the second resin member. That is, the second resin member may be formed so as not to reach the peripheral edge part (outer edge) of the surface of the bottom wall part. At the time of manufacturing the optical module for an encoder, the second resin member before being cured is disposed on the surface of the bottom wall part; however, in the case of forming the second resin member so as not to reach the peripheral edge part of the surface of the bottom wall part, it is not necessary to dispose a configuration for blocking the second resin member before being cured (for example, a side wall part) on the bottom wall part. Therefore, the reduction in size of the optical module for an encoder can be achieved.

The support may further include a side wall part disposed on the surface of the bottom wall part, the side wall part may surround the light receiving element and the second resin member when viewed from a thickness direction of the bottom wall part, and the second resin member may be in contact with the side wall part. In this case, at the time of manufacturing the optical module for an encoder, the second resin member before being cured can be blocked by the side wall part. Therefore, a material having a low viscosity can be used as a material for the second resin member. Furthermore, the light receiving element can be protected from physical contact by the side wall part.

The first resin member may be an adhesive film. In this case, since the heated first resin member is cured in a relatively short time, the fiber optical plate can be accurately bonded to the light receiving element by the first resin member.

The first resin member may be a die attach film. In this case, since the heated first resin member is cured in a relatively short time, the fiber optical plate can be accurately bonded to the light receiving element by the first resin member.

An outer edge of the first resin member may overlap an outer edge of the fiber optical plate when viewed from the thickness direction of the bottom wall part. In this case, since the first resin member does not protrude to the outside of the fiber optical plate when viewed from the thickness direction of the bottom wall part, a contact area between the first resin member and the second resin member can be reduced. Therefore, in a case where the first resin member and the second resin member are thermally shrunk or thermally expanded due to a change in environmental temperature, it is possible to suppress occurrence of damage at a contact portion between the first resin member and the second resin member.

A light transmittance of the second resin member may be lower than a light transmittance of the first resin member. In this case, noise light from the side toward the light receiving element can be blocked by the second resin member while suppressing light from the fiber optical plate toward the light receiving element from being blocked by the first resin member. As a result, the detection accuracy can be improved.

The second resin member is harder than the first resin member. In this case, the fiber optical plate and the light receiving element can be more reliably supported by the second resin member while suppressing the occurrence of peeling between the fiber optical plate and the light receiving element bonded by the first resin member. As a result, the fiber optical plate can be stably disposed on the light receiving element.

The optical module for an encoder may further include an anti-reflective layer formed on the input surface of the fiber optical plate. In this case, reflection of light on the input surface of the fiber optical plate can be suppressed, and detection accuracy can be improved.

The fiber optical plate may include a pair of side surfaces facing opposite sides to each other in a direction perpendicular to the thickness direction of the bottom wall part, and the second resin member may be in contact with both of the pair of side surfaces. In this case, the light receiving element and the fiber optical plate can be more reliably supported by the second resin member.

An encoder according to one aspect of the present disclosure includes: a rotary plate including a light passage pattern or a light reflection pattern; and the above-described optical module for an encoder disposed with light passing through the light passage pattern or light reflected by the light reflection pattern being incident on the light receiving element. According to this encoder, from the above-described reason, a design according to required performance can be realized.

A method for manufacturing an optical module for an encoder according to one aspect of the present disclosure a method for manufacturing an optical module for an encoder including a support including a bottom wall part, a light receiving element including a light receiving surface, a fiber optical plate including an input surface constituted by surfaces of one end of a plurality of optical fibers and an output surface constituted by surfaces of the other end of the plurality of optical fibers, a first resin member configured to bond the fiber optical plate to the light receiving element, and a second resin member disposed on a surface of the bottom wall part, the method including, in the stated order: a first step of disposing the light receiving element on the surface of the bottom wall part with the light receiving surface facing a side opposite to the bottom wall part; a second step of disposing the fiber optical plate on the light receiving element with the output surface facing the light receiving surface and bonding the fiber optical plate to the light receiving element by the first resin member disposed between the light receiving surface and the output surface; and a third step of disposing the second resin member on the surface of the bottom wall part so as to be in contact with the light receiving element and the fiber optical plate, in which a material for the first resin member and a material for the second resin member are different from each other.

This method for manufacturing an optical module for an encoder includes a second step of disposing the fiber optical plate on the light receiving element with the output surface facing the light receiving surface of the light receiving element and bonding the light receiving element and the fiber optical plate by the first resin member disposed between the light receiving surface and the output surface, and a third step of disposing the second resin member on the surface of the bottom wall part so as to be in contact with the light receiving element, the first resin member, and the fiber optical plate. Thereby, the fiber optical plate can be firmly bonded to the light receiving element by the first resin member, and the fiber optical plate and the light receiving element can be reliably supported by the second resin member. Furthermore, a material for the first resin member and a material for the second resin member are different from each other. Thereby, as described above, the degree of freedom in material selection of the first resin member and the second resin member can be increased, and as a result, a design according to required performance can be realized. Further, in this method for manufacturing an optical module for an encoder, after the second step of bonding the fiber optical plate to the light receiving element by the first resin member, the third step of disposing the second resin member on the surface of the bottom wall part so as to be in contact with the light receiving element, the first resin member, and the fiber optical plate is performed. Thereby, displacement of the position of the fiber optical plate with respect to the light receiving element at the time of manufacturing can be suppressed, and a decrease in yield can be suppressed.

The first resin member may be an adhesive film. In this case, since the heated first resin member is cured in a relatively short time, the fiber optical plate can be accurately bonded to the light receiving element by the first resin member.

The first resin member may be a die attach film. In this case, since the heated first resin member is cured in a relatively short time, the fiber optical plate can be accurately bonded to the light receiving element by the first resin member.

In the second step, the fiber optical plate may be bonded to the light receiving element by curing the first resin member, in the third step, the second resin member may be disposed on the surface of the bottom wall part and then cured, and a viscosity of the first resin member before being cured in the second step may be lower than a viscosity of the second resin member before being cured in the third step. In this case, since the viscosity of the first resin member before being cured is low, generation of air bubbles and the like in the first resin member after being cured can be suppressed, and the fiber optical plate can be stably disposed on the light receiving element. Furthermore, since the viscosity of the second resin member before being cured is high, a configuration for blocking the second resin member before being cured (for example, a side wall part) can be omitted, and the manufacturing efficiency can be improved.

The method for manufacturing an optical module for an encoder may further include a forming step of forming the fiber optical plate before the second step, and the forming step may include, in the stated order: a step of attaching a second substrate including a plurality of portions corresponding to the first resin member to a first substrate including a plurality of portions corresponding to the fiber optical plate, and a step of cutting the first substrate and the second substrate to acquire a plurality of the fiber optical plates attached with the first resin member. In this case, for example, the manufacturing efficiency can be improved as compared with a case where the first resin member is individually attached to the plurality of fiber optical plates.

A third substrate including a plurality of bottom wall portions corresponding to the bottom wall part may be used, in the first step, for each of the plurality of bottom wall portions, the light receiving element may be disposed on the surface of the bottom wall part with the light receiving surface facing a side opposite to the bottom wall part, in the second step, for each of the plurality of bottom wall portions, the fiber optical plate may be disposed on the light receiving element with the output surface facing the light receiving surface and the fiber optical plate may be bonded to the light receiving element by the first resin member disposed between the light receiving surface and the output surface, in the third step, for each of the plurality of bottom wall portions, the second resin member may be disposed on the surface of the bottom wall part so as to be in contact with the light receiving element, the first resin member, and the fiber optical plate, and the method for manufacturing an optical module for an encoder may further include a fourth step of cutting the third substrate to acquire a plurality of the optical modules for an encoder after the third step. In this case, for example, the manufacturing efficiency can be improved as compared with a case where the light receiving element and the like are individually disposed on the plurality of singulated bottom wall parts.

In the third step, the second resin member may be disposed on the surface of the bottom wall part with the second resin member being separated from a boundary between the plurality of bottom wall portions. In this case, since it is not necessary to provide a configuration for blocking the second resin member before being cured (for example, a side wall part) on the boundary, the manufacturing efficiency can be improved.

Advantageous Effects of Invention

According to one aspect of the present disclosure, it is possible to provide an optical module for an encoder, an encoder, and a method for manufacturing such an optical module for an encoder, which can realize a design according to required performance.

DESCRIPTION OF EMBODIMENTS

Figure 1:
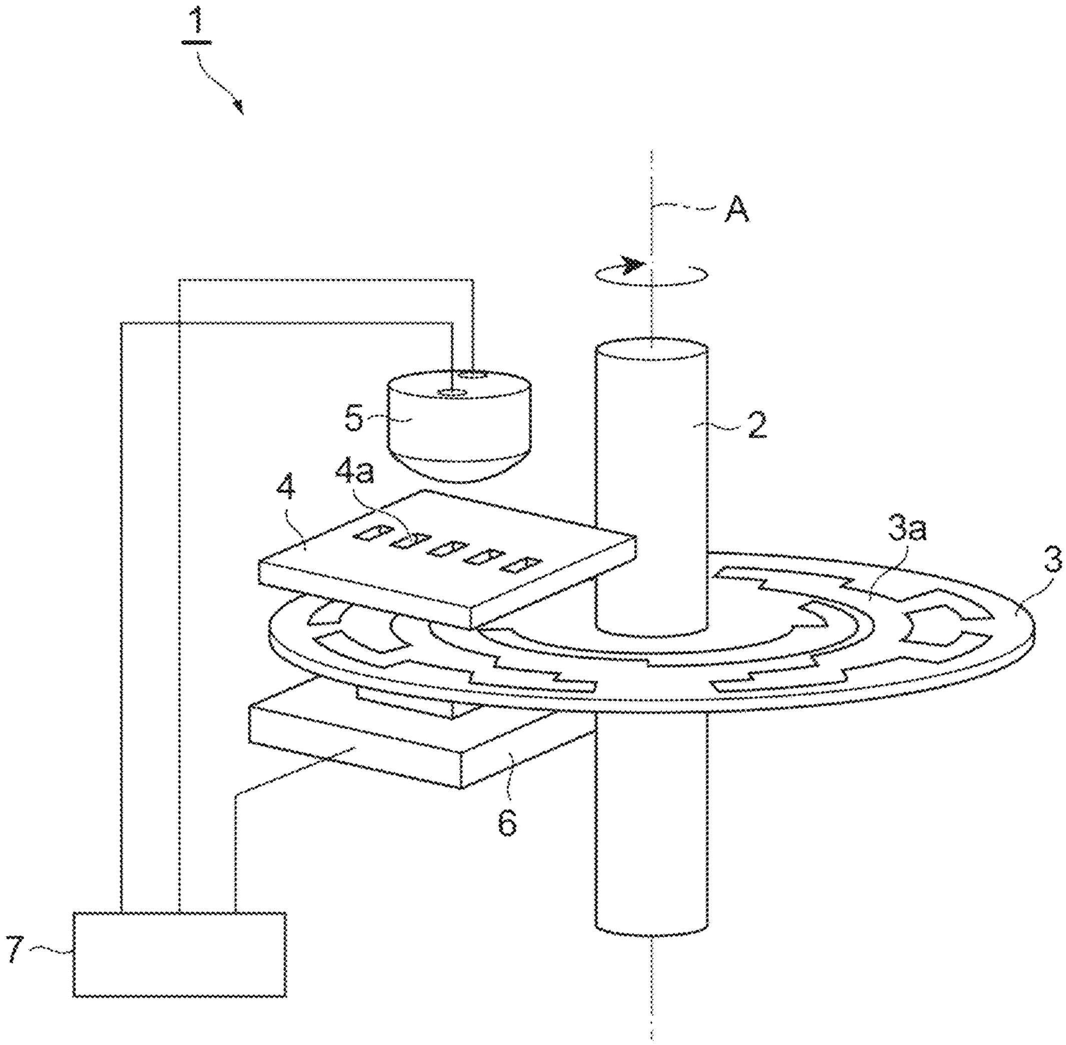
FIG. 1 is a perspective view of an encoder according to an embodiment.

Hereinafter, an embodiment of the present disclosure will be described in detail with reference to the drawings. The following description will use the same reference numerals for the same or equivalent elements, and repeated descriptions will be omitted.

[Configuration of Encoder]

As illustrated in FIG. 1, an encoder 1 includes a rotating shaft 2, a rotary plate 3, a fixed plate 4, a light source 5, an optical module (optical module for an encoder) 6, and a processing unit 7. The rotating shaft 2 rotates around an axis A as a center line. The encoder 1 is, for example, an absolute type rotary encoder and is a device for detecting an absolute angle of an object to be measured connected to the rotating shaft 2. In the present embodiment, the encoder 1 is a transmissive encoder.

The rotary plate 3 is fixed to the rotating shaft 2 and rotates with the rotating shaft 2. The rotary plate 3 is a so-called code wheel. The rotary plate 3 is formed in a disk shape, and is attached to the rotating shaft 2 at a center part so as to be disposed perpendicular to the axis A. The rotary plate 3 has a light passage pattern 3*a* through which light emitted from the light source 5 passes. The light passage pattern 3*a* represents a predetermined pattern such as a gray code. The light passage pattern 3*a* is constituted by a plurality of slits penetrating the rotary plate 3. The insides of the slits may be air gaps or a transparent glass part may be disposed in the slit.

The fixed plate 4 is fixed at a position facing the rotary plate 3. The fixed plate 4 is formed in, for example, a rectangular plate shape and is disposed in parallel with the rotary plate 3. The fixed plate 4 has a light passage pattern 4*a* formed so as to be positioned on a straight line connecting the light source 5 and the optical module 6. The light passage pattern 4*a* is constituted by a plurality of slits penetrating the fixed plate 4. The insides of the slits may be air gaps or a transparent glass part may be disposed in the slit. The light source 5 is, for example, a light emitting element such as an LED (Light Emitting Diode). The light source 5 is disposed on a side opposite to the optical module 6 with respect to the rotary plate 3, and emits light toward the rotary plate 3.

The optical module 6 is an optical module for an encoder to be applied to the encoder 1, and is fixed to a position on a side opposite to the light source 5 with respect to the rotary plate 3 and the fixed plate 4. The optical module 6 has a light receiving element 12 described later, and light from the light source 5 is detected by the light receiving element 12. The processing unit 7 is, for example, a signal processing circuit, encodes the light detection result in the light receiving element 12 of the optical module 6, and outputs a gray code representing an absolute value of a rotation angle of the rotating shaft 2.

In the encoder 1, when the light passage pattern 3*a* of the rotary plate 3 and the light passage pattern 4*a* of the fixed plate 4 overlap on a straight line connecting the light source 5 and the light receiving element 12 of the optical module 6, the light from the light source 5 passes through the rotary plate 3 and the fixed plate 4 and is incident on the light receiving element 12. On the other hand, in a case where the light passage pattern 3*a* and the light passage pattern 4*a* do not overlap, the light from the light source 5 is blocked by the rotary plate 3 and is not incident on the light receiving element 12.

[Configuration of Optical Module]

Figure 2:
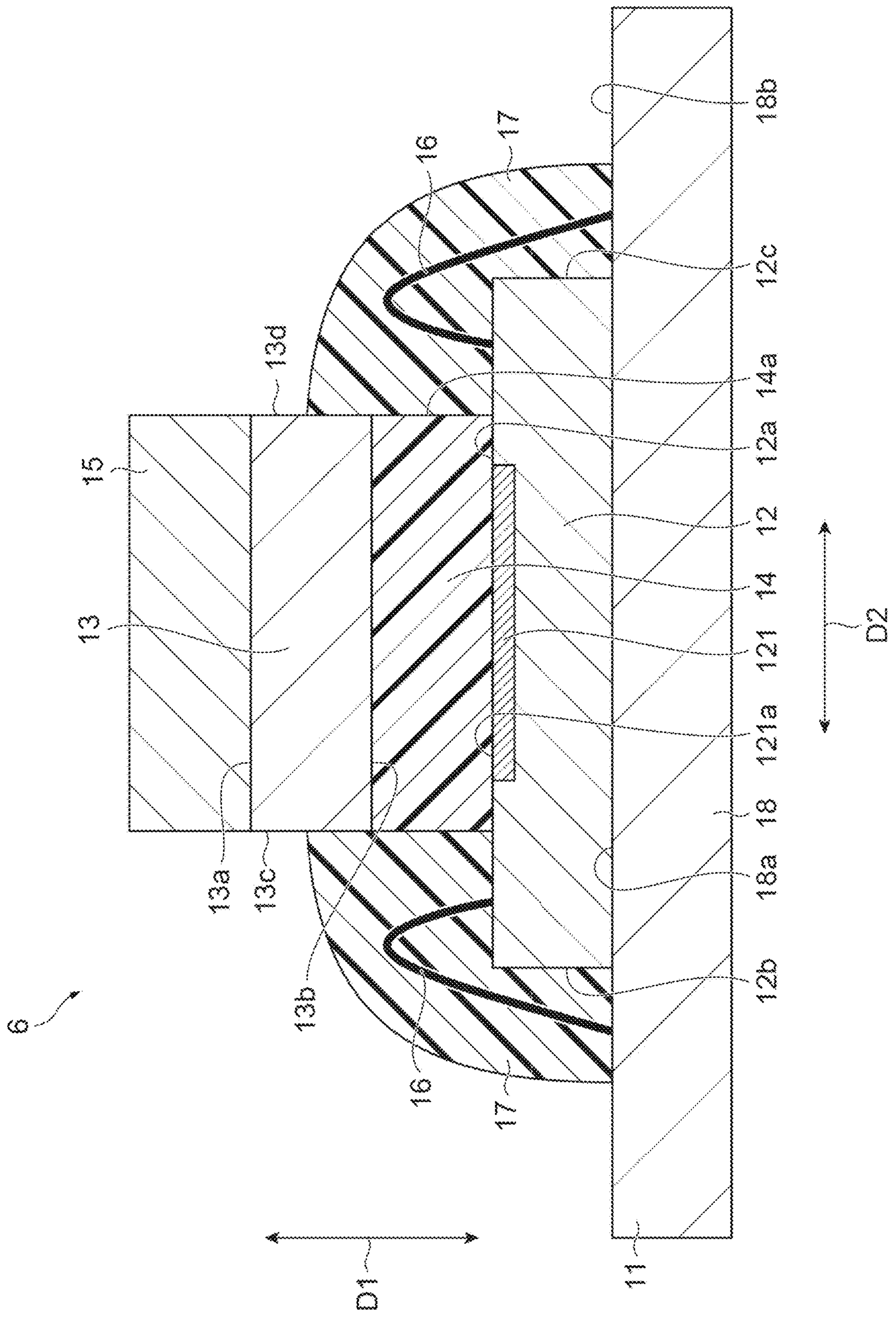
FIG. 2 is a cross-sectional view of an optical module illustrated in FIG. 1.

As illustrated in FIG. 2, the optical module 6 includes a support 11, a light receiving element 12, a fiber optical plate 13, a first resin member 14, an anti-reflective layer 15, a wire 16, and a second resin member 17.

In this example, the support 11 is a substrate member composed of only a bottom wall part 18. The bottom wall part 18 has a rectangular plate shape and has a flat surface 18*a*. The bottom wall part 18 may be formed of, for example, a glass epoxy resin. The bottom wall part 18 has wiring (not illustrated) to which the wire 16 is connected. Hereinafter, a thickness direction of the bottom wall part 18 (a direction perpendicular to the surface 18*a*) is defined as a direction D1, and a direction perpendicular to the direction D1 is defined as a direction D2.

The light receiving element 12 is a rectangular plate-shaped light receiving chip, and detects light passing through the light passage pattern 3*a*. The light receiving element 12 has a light receiving part 121. The light receiving part 121 is, for example, a photodiode or a photodiode array, and has a light receiving surface 121*a* on an upper surface 12*a* side of the light receiving element 12. The light receiving surface 121*a* is positioned at a central portion of the upper surface 12*a*, and constitutes a part of the upper surface 12*a*. The light receiving element 12 is disposed on the surface 18*a* of the bottom wall part 18 such that the light receiving surface 121*a* faces a side opposite to the bottom wall part 18. The light receiving element 12 has a pair of side surfaces 12*b* and 12*c* facing opposite sides to each other in the direction D2. For example, the light receiving element 12 converts light incident on the light receiving surface 121*a* into an electric signal, and outputs the converted electric signal to the processing unit 7. The light receiving element 12 has wiring (not illustrated) to which the wire 16 for outputting an electric signal is connected.

The fiber optical plate (also referred to as "FOP" hereinafter) 13 is an optical component formed by bundling a plurality of optical fibers. The FOP 13 includes, for example, tens of millions of optical fibers having a diameter of several nm to several tens of nm. The FOP 13 has a rectangular parallelepiped shape, and has an input surface 13*a*, an output surface 13*b*, and a pair of side surfaces 13*c* and 13*d* connecting the input surface 13*a* and the output surface 13*b*. The input surface 13*a* is constituted by surfaces of one end of a plurality of optical fibers included in the FOP 13, and the output surface 13*b* is constituted by surfaces of the other end of the plurality of optical fibers. In the present embodiment, the input surface 13*a* and the output surface 13*b* are parallel to each other and face opposite sides to each other in the direction D1. The pair of side surfaces 13*c* and 13*d* face opposite sides to each other in the direction D2.

The FOP 13 is disposed on the light receiving element 12 such that the input surface 13*a* and the output surface 13*b* are parallel to the light receiving surface 121*a* of the light receiving element 12 and the output surface 13*b* faces the light receiving surface 121*a*. The light incident on the input surface 13*a* of the FOP 13 propagates in each optical fiber constituting the FOP 13, and is emitted from the output surface 13*b* toward the light receiving surface 121*a*. The light incident on the input surface 13*a* is emitted from the output surface 13*b* without spreading in the FOP 13.

The first resin member 14 is disposed between the light receiving surface 121*a* and the output surface 13*b*, and bonds the FOP 13 to the light receiving element 12. The first resin member 14 is in contact with the light receiving surface 121*a* and the output surface 13*b*. In the present embodiment, the first resin member 14 is in contact with the entire output surface 13*b* and a central portion of the upper surface 12*a* including the light receiving surface 121*a*. The first resin member 14 is not in contact with an outer edge portion of the upper surface 12*a*. When viewed from the direction D1, an outer edge of the first resin member 14 overlaps an outer edge of the FOP 13, and the first resin member 14 does not protrude to the outside of the FOP 13. In other words, when viewed from the direction D1, the shape of the first resin member 14 is the same as the shape of the FOP 13.

The first resin member 14 is constituted by, for example, an adhesive film that is a die attach film. The die attach film is formed into a film shape, and an object to be bonded can be attached to both surfaces thereof. For example, the die attach film is attached to the object to be bonded by being heated and cured.

The anti-reflective layer 15 is formed into a film shape on the input surface 13*a*, and prevents reflection of light on the input surface 13*a*. The anti-reflective layer 15 is formed over the entire input surface 13*a*.

The wire 16 is a bonding wire connected to the bottom wall part 18 and the light receiving element 12. One end of the wire 16 is connected to the exposed portion of the wiring of the bottom wall part 18 on the surface 18*a*, and the other end of the wire 16 is connected to the exposed portion of the wiring of the light receiving element 12 on the upper surface 12*a*. The wire 16 is curved so as to be convex toward a side opposite to the bottom wall part 18 (a side on which the light receiving element 12 is positioned with respect to the bottom wall part 18).

The second resin member 17 is disposed on the surface 18*a* of the bottom wall part 18, and supports the light receiving element 12 and the FOP 13. The second resin member 17 is disposed on both sides of the FOP 13 in the direction D2. The second resin member 17 is in contact with the light receiving element 12, the FOP 13, and the first resin member 14. More specifically, the second resin member 17 is in contact with the exposed portion of the surface 18*a* from the light receiving element 12, the exposed portion of the upper surface 12*a* of the light receiving element 12 from the first resin member 14, the side surface 12*b* and 12*c*, the outer edge part 14*a* of the first resin member 14, and the side surface 13*c* and 13*d* of the FOP 13. In the present embodiment, the second resin member 17 is in contact with a region on the first resin member 14 side in each of the side surfaces 13*c* and 13*d*, and is not in contact with a region on the anti-reflective layer 15 side.

The second resin member 17 covers the wire 16. In the present embodiment, the second resin member 17 covers the entire wire 16. That is, the wire 16 is not exposed from the second resin member 17. The second resin member 17 is formed so as not to reach a peripheral edge part 18*b* of the surface 18*a*. That is, the peripheral edge part 18*b* is exposed from the second resin member 17. The peripheral edge part 18*b* is, for example, a rectangular frame-shaped portion extending along the outer edge of the surface 18*a* so as to surround the light receiving element 12 and the second resin member 17 when viewed from the direction D1.

The first resin member 14 is formed of a first resin material, and the second resin member 17 is formed of a second resin material. The first resin material and the second resin material are different from each other. The first resin material may be constituted by one material, or may be constituted by a plurality of materials. Similarly, the second resin material may be constituted by one material, or may be constituted by a plurality of materials. The fact that the first resin material and the second resin material are different from each other means that the first resin material and the second resin material are different from each other in terms of type or ratio. The fact that the first resin material and the second resin material are different from each other in terms of type means that one of the first resin material and the second resin material contains at least one or more materials that are not contained in the other. Furthermore, the fact that the first resin material and the second resin material are different from each other in terms of ratio means that the ratio between the materials contained in the first resin material is different from the ratio between the materials contained in the second resin material. That is, even when the first resin material and the second resin material are constituted by a common material, in a case where the ratios of the materials are different, it can be said that the first resin material and the second resin material are different from each other. Since the first resin material and the second resin material are different from each other, the first resin member 14 and the second resin member 17 have different properties (for example, light transmittance, hardness, and the like). The first resin material is, for example, a silicone resin, an acrylic resin, or the like. The second resin material is, for example, an epoxy resin or the like. The first resin material and the second resin material are a thermosetting resin or a thermoplastic resin, preferably a thermosetting resin.

In the present embodiment, a light transmittance of the second resin member 17 is lower than a light transmittance of the first resin member 14. In other words, the light shielding property of the second resin member 17 is higher than the light shielding property of the first resin member 14. The light transmittance in this case is a light transmittance with respect to light having a wavelength of light emitted from the light source 5, and is, for example, a light transmittance with respect to light having a wavelength of 800 nm to 900 nm. The light transmittance of the first resin member 14 may be, for example, 90% or more, and the light transmittance of the second resin member 17 may be, for example, 5% or less.

In the present embodiment, the second resin member 17 is harder than the first resin member 14. In this example, a Young's modulus of the second resin member 17 is higher than a Young's modulus of the first resin member 14. The Young's modulus of the first resin member 14 may be, for example, about $1\times10^6$ Pa, and the Young's modulus of the second resin member 17 may be, for example, about $8\times10^9$ Pa.

[Method for Manufacturing Optical Module]

A method for manufacturing the optical module 6 will be described with reference to FIGS. 3 to 5. Hereinafter, an example of collectively manufacturing a plurality of the optical modules 6 will be described. First, a substrate 20 (third substrate) having a rectangular plate shape is prepared (FIG. 3(*a*)). The substrate 20 has a plurality of bottom wall portions 21 each corresponding to the bottom wall part 18. The "bottom wall portion corresponding to the bottom wall part" is a portion that becomes the bottom wall part 18 after a cutting step of the substrate 20. The plurality of bottom wall portions 21 are positioned so as to be arranged in a lattice shape on the substrate 20, and a boundary L1 (dicing line) is set between the adjacent bottom wall portions 21. The substrate 20 is cut (diced) along the boundary L1 in the subsequent cutting step. Each bottom wall portion 21 has a surface 21*a* that becomes the surface 18*a* after the cutting step. Wiring is formed in the bottom wall portion 21, and the wiring has terminals 22 exposed on the surface 21*a*. The following steps are performed for each bottom wall portion 21.

Figure 3:
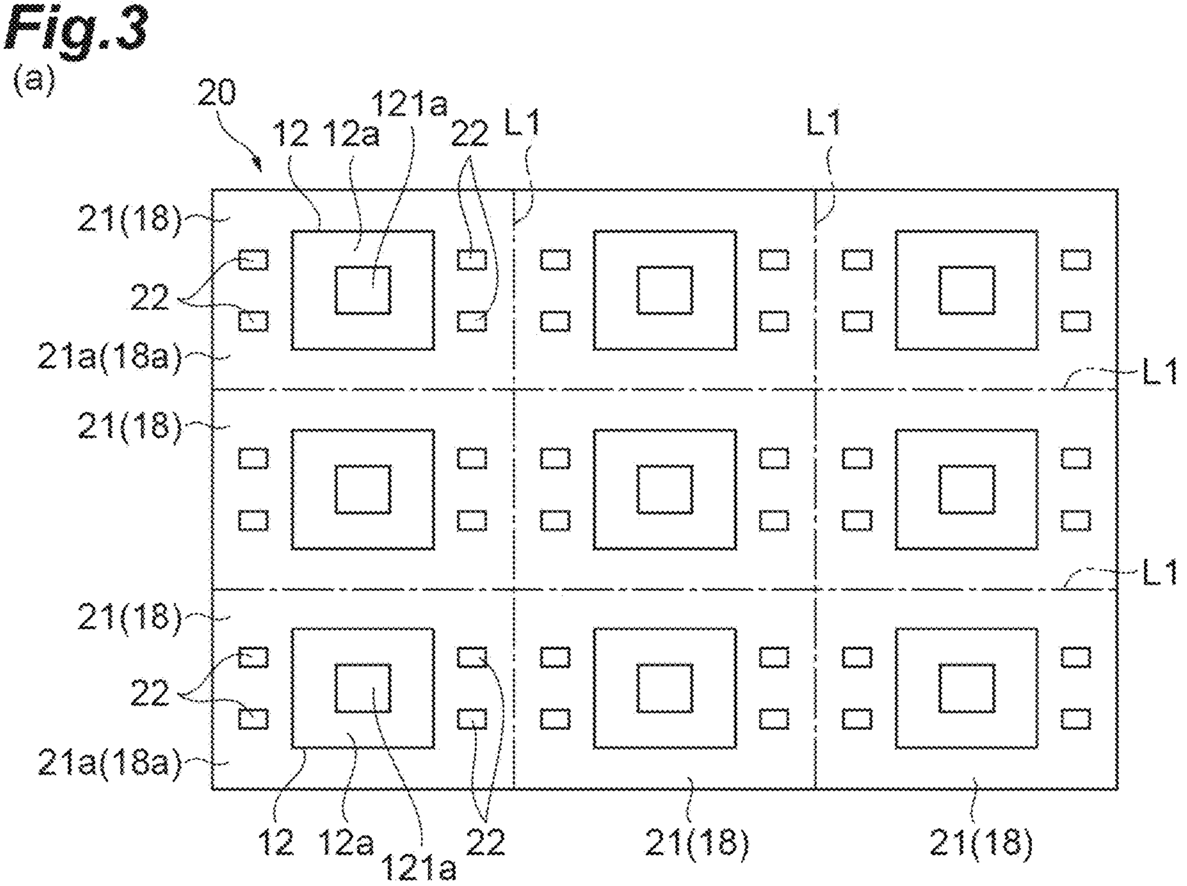
FIGS. 3(*a*) and 3(*b*) are views illustrating a method for manufacturing an optical module.
Figure 3:
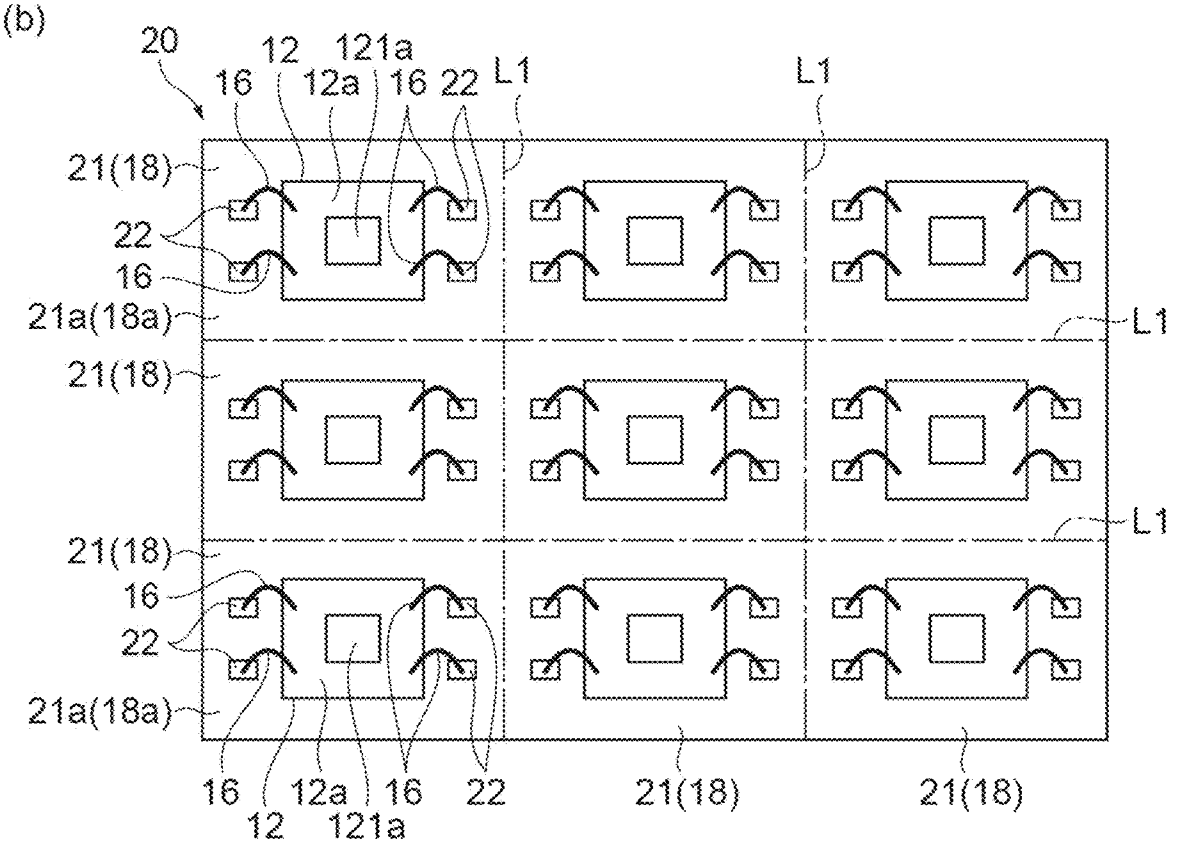

Subsequently, as illustrated in FIG. 3(*a*), the light receiving element 12 is disposed on the surface 21*a* (surface 18*a*) of the bottom wall portion 21 such that the light receiving surface 121*a* faces a side opposite to the bottom wall portion 21 (first step).

Subsequently, as illustrated in FIG. 3(*b*), the light receiving element 12 and the bottom wall portion 21 are connected by the wire 16. More specifically, one end of the wire 16 is connected to the terminal 22 of the bottom wall portion 21, and the other end of the wire 16 is connected to the exposed portion of the wiring of the light receiving element 12 on the upper surface 12*a*.

Here, a forming step of forming the FOP 13 to be used in a second step described later will be described with reference to FIG. 4. First, a substrate 30 (first substrate) having a rectangular plate shape is prepared (FIG. 4(*a*)). The substrate 30 is formed by bundling a plurality of optical fibers, and has a plurality of portions 31 each corresponding to the FOP 13. The "portion corresponding to the FOP" is a portion that becomes the FOP 13 after a cutting step of the substrate 30. The plurality of portions 31 are positioned so as to be arranged in a lattice shape on the substrate 30, and a boundary L2 (dicing line) is set between the adjacent portions 31. The substrate 20 is cut (diced) along the boundary L2 in the subsequent cutting step.

Figure 4:
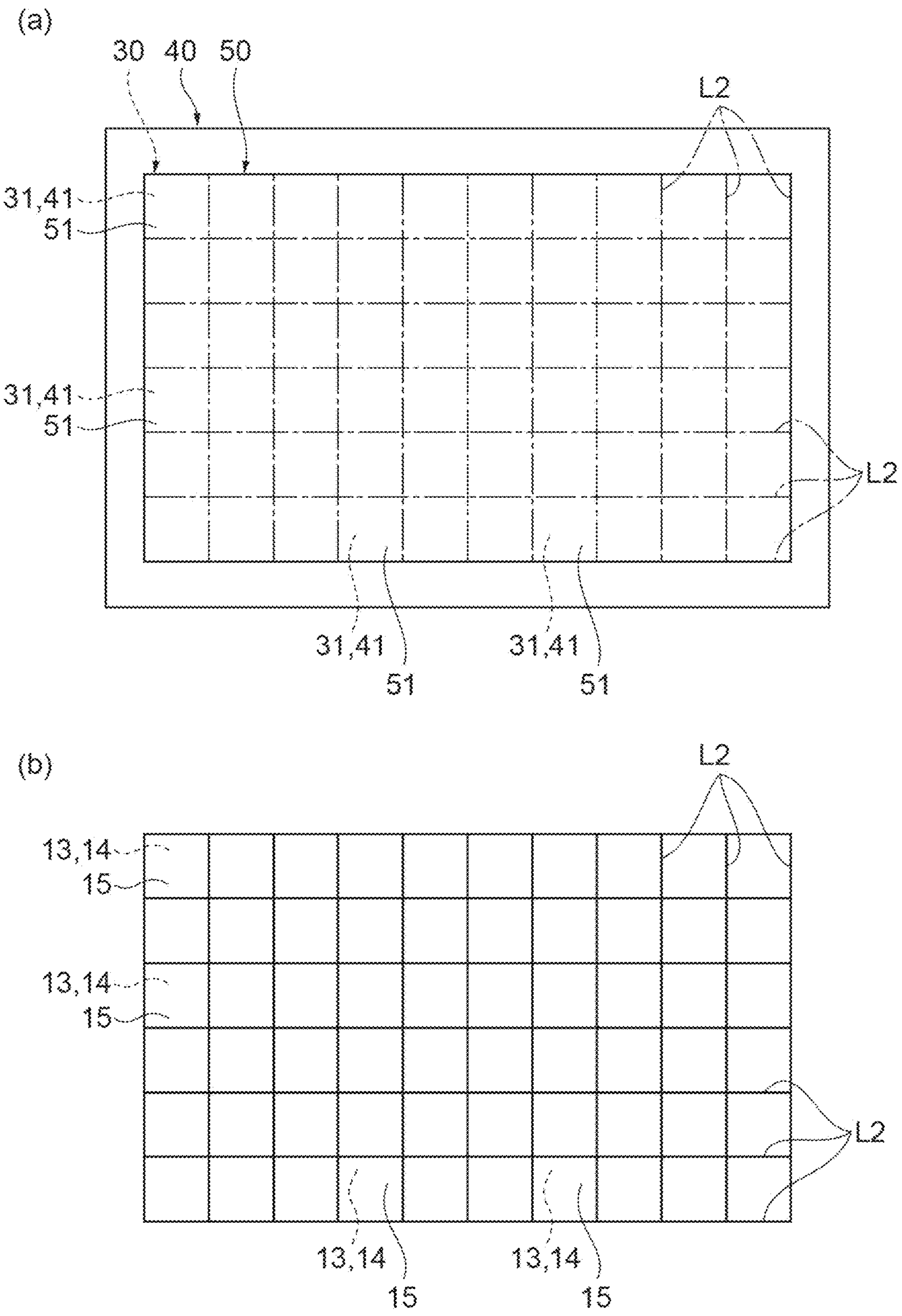
FIGS. 4(*a*) and 4(*b*) are views illustrating the method for manufacturing an optical module.

Subsequently, as illustrated in FIG. 4(*a*), a substrate 40 (second substrate) having a film shape is attached to one main surface of the substrate 30. The substrate 40 is an adhesive film having a plurality of portions 41 each corresponding to the first resin member 14, and is a die attach film in the present embodiment. The "portion corresponding to the first resin member" is a portion that becomes the first resin member 14 after a cutting step of the substrate 40. The plurality of portions 41 are positioned so as to be arranged in a lattice shape on the substrate 40, and the boundary L2 common to the substrate 30 is set between the adjacent portions 41. Each portion 41 overlaps the corresponding portion 31. The substrate 40 is cut along the boundary L2 together with the substrate 30.

Subsequently, a substrate 50 is formed on the other main surface of the substrate 30. The substrate 50 is a thin film having a plurality of portions 51 each corresponding to the anti-reflective layer 15. The "portion corresponding to the anti-reflective layer" is a portion that becomes the anti-reflective layer 15 after a cutting step of the substrate 50. The substrate 50 is formed by, for example, subjecting the other main surface of the substrate 30 to a coating treatment. The plurality of portions 51 are positioned so as to be arranged in a lattice shape on the substrate 50, and the boundary L2 common to the substrate 30 is set between the adjacent portions 51. Each portion 51 overlaps the corresponding portion 31. The substrate 50 is cut along the boundary L2 together with the substrate 30.

Subsequently, as illustrated in FIG. 4(*b*), a laminate composed of the substrate 30, the substrate 40, and the substrate 50 is collectively cut along the boundary L2 to acquire a plurality of the FOPs 13. In this cutting step, the substrate 40 may be used as a fixing member fixing the laminate. For example, the substrate 40 may have a dicing tape on a surface opposite to the substrate 30, and the laminate may be fixed to a base (for example, a dicing frame) on which the laminate is placed during the cutting step by the dicing tape. The dicing tape is peeled off before the next second step is performed. In each of the acquired FOPs 13, the first resin member 14 is attached to one surface, and the anti-reflective layer 15 is formed on the other surface. The surface of the FOP 13 to which the first resin member 14 is attached corresponds to the output surface 13*b*, and the surface of the FOP 13 on which the anti-reflective layer 15 is formed corresponds to the input surface 13*a*.

Figure 5:
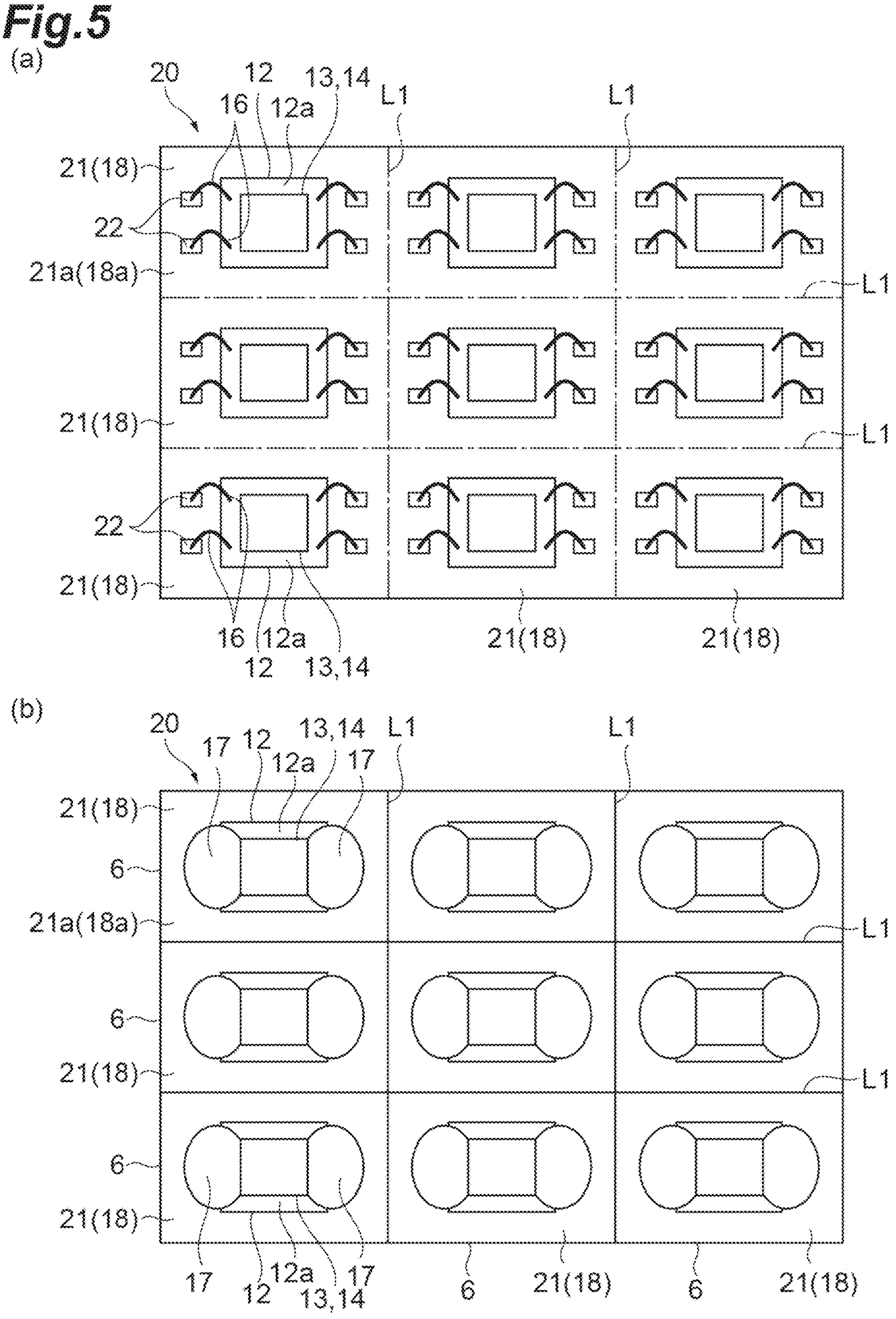
FIGS. 5(*a*) and 5(*b*) are views illustrating the method for manufacturing an optical module.

Subsequently, as illustrated in FIG. 5(*a*), the FOP 13 is disposed such that the output surface 13*b* of the FOP 13 faces the light receiving surface 121*a* of the light receiving element 12, and the FOP 13 is bonded to the light receiving element 12 by the first resin member 14 disposed between the light receiving surface 121*a* and the output surface 13*b* (second step). In a case where the first resin member 14 is a thermosetting resin, for example, the first resin member 14 is bond to the light receiving surface 121*a* and the output surface 13*b* by curing the first resin member 14 by heating. In a case where the first resin member 14 is a thermoplastic resin, for example, the surface of the first resin member 14 is bonded to the light receiving surface 121*a* and the output surface 13*b* by softening the first resin member 14 by heating and then curing the first resin member 14. Thereby, the FOP 13 is bonded to the light receiving element 12 with the first resin member 14 interposed therebetween. For example, in a case where the first resin material is a thermosetting resin, when an acrylic resin is used as the thermosetting resin, the first resin member 14 is cured at about 150° C., and when a silicone resin is used as the thermosetting resin, the first resin member 14 is cured at normal temperature (5° C. to 35° C.). Note that, in a case where the first resin member 14 is a thermosetting resin that is cured at normal temperature, a heating treatment includes heating the first resin member 14 from a temperature lower than normal temperature to a temperature higher than normal temperature.

Subsequently, as illustrated in FIG. 5(*b*), the second resin member 17 is disposed on the surface 18*a* of the bottom wall part 18 so as to be in contact with the light receiving element 12, the FOP 13, and the first resin member 14 (third step). In the third step, in a case where the second resin member 17 is a thermosetting resin, for example, the second resin member 17 is disposed on the surface 18*a* and then cured by heating. In a case where the second resin member 17 is a thermoplastic resin, for example, the second resin member 17 melted by heating is disposed on the surface 18*a* and then cured. Note that, in a case where the second resin member 17 is a thermosetting resin that is cured at normal temperature, a heating treatment includes heating the second resin member 17 from a temperature lower than normal temperature to a temperature equal to or higher than normal temperature. The second resin member 17 is disposed on both sides of the FOP 13 in a direction perpendicular to the thickness direction of the substrate 20 so as to cover the entire wires 16.

In the present embodiment, the viscosity of the first resin member 14 before being cured in the second step is lower than the viscosity of the second resin member 17 before being cured in the third step. In a case where the resin member is a thermoplastic resin, the "viscosity of the resin member before being cured" refers to the viscosity of the resin member in a state where the resin member is heated and softened. Furthermore, in a case where the first resin member 14 and the second resin member 17 are thermosetting resins that are cured at a temperature higher than normal temperature, the viscosity of the first resin member 14 at normal temperature before being cured may be, for example, 10 Pa's or less, and the viscosity of the second resin member 17 at normal temperature before being cured may be, for example, 200 Pas or more.

In the third step, the second resin member 17 is disposed on the surface 18*a* of the bottom wall part 18 such that the second resin member 17 is separated from the boundary L1 (so as not to reach the boundary L1). Thereby, the peripheral edge part 18*b* of the bottom wall portion 21 (bottom wall part 18) is exposed from the second resin member 17 after curing. In this example, since the viscosity of the heated second resin member 17 is high, the second resin member 17 does not reach the boundary L1. In other words, the viscosity of the second resin member 17 is adjusted so that the second resin member 17 does not reach the boundary L1.

Subsequently, the substrate 20 is cut along the boundary L1 to acquire a plurality of the optical modules 6 (fourth step). The manufacturing process of the optical module 6 is thus completed.

[Functions and Effects]

The optical module 6 includes the first resin member 14 disposed between the light receiving surface 121*a* of the light receiving element 12 and the output surface 13*b* of the FOP 13 and bonding the FOP 13 to the light receiving element 12, and the second resin member 17 disposed on the surface 18*a* of the bottom wall part 18 so as to be in contact with the light receiving element 12 and the FOP 13. Thereby, the FOP 13 can be firmly bonded to the light receiving element 12 by the first resin member 14, and the FOP 13 and the light receiving element 12 can be reliably supported by the second resin member 17. Furthermore, a material for the first resin member 14 and a material for the second resin member 17 are different from each other. Thereby, the degree of freedom in material selection of the first resin member 14 and the second resin member 17 can be increased, and as a result, a design according to required performance can be realized. For example, the first resin member 14 can be formed from a material having a high light transmittance, and the second resin member 17 can be formed from a material having a low light transmittance. In this case, noise light from the side toward the light receiving element 12 can be blocked by the second resin member 17 while suppressing light from the FOP 13 toward the light receiving element 12 from being blocked by the first resin member 14. As a result, the detection accuracy can be improved. As another example, the first resin member 14 can also be formed from a soft material, and the second resin member 17 can also be formed from a hard material. In this case, the FOP 13 and the light receiving element 12 can be more reliably supported by the second resin member 17 while suppressing the occurrence of peeling between the FOP 13 and the light receiving element 12 bonded by the first resin member 14. As a result, the FOP 13 can be stably disposed on the light receiving element 12. As still another example, the first resin member 14 can also be formed from a material having a low viscosity before being cured, and the second resin member 17 can also be formed from a material having a high viscosity before being cured. In this case, generation of air bubbles and the like in the first resin member 14 after being cured is suppressed so that the FOP 13 can be stably disposed on the light receiving element 12, and a configuration for blocking the second resin member 17 before being cured (for example, a side wall part) is omitted so that the manufacturing efficiency can be improved. As described above, according to the optical module 6, a design according to required performance can be realized.

The second resin member 17 covers the wire 16. Thereby, the wire 16 can be protected from oil scattered when the encoder 1 is used, physical external force, and the like.

The peripheral edge part 18*b* of the surface 18*a* of the bottom wall part 18 may be exposed from the second resin member 17. That is, the second resin member 17 may be formed so as not to reach the peripheral edge part 18*b* of the surface 18*a* of the bottom wall part 18. At the time of manufacturing the optical module 6, the second resin member 17 before being cured is disposed on the surface 18*a*; however, in the case of forming the second resin member 17 so as not to reach the peripheral edge part 18*b* of the surface 18*a*, it is not necessary to dispose a configuration for blocking the second resin member 17 before being cured (for example, a side wall part) on the bottom wall part 18. Therefore, the reduction in size of the optical module 6 can be achieved. Furthermore, since it is not necessary to dispose a configuration for blocking the second resin member 17 before being cured on the bottom wall part 18, the manufacturing efficiency can also be improved. Further, since it is not necessary to dispose a configuration for blocking the second resin member 17 on the bottom wall part 18, the area of the bottom wall part 18 can be reduced, and a greater number of optical modules 6 can be manufactured from one substrate 20.

The first resin member 14 is an adhesive film (die attach film). Thereby, since the heated first resin member 14 is cured in a relatively short time, the FOP 13 can be accurately bonded to the light receiving element 12 by the first resin member 14. That is, for example, in a case where the first resin member 14 is not an adhesive film but is a resin member requiring time for curing after heating, the position of the FOP 13 may be shifted until the resin material is cured. On the other hand, in a case where the first resin member 14 is an adhesive film, the heated first resin member 14 is cured in a relatively short time, so that such positional displacement of the FOP 13 can be suppressed, and the FOP 13 can be accurately bonded to the light receiving element 12 by the first resin member 14. As a result, the yield can be improved.

An outer edge of the first resin member 14 overlaps an outer edge of the FOP 13 when viewed from the direction D1. Thereby, since the first resin member 14 does not protrude to the outside of the FOP 13 when viewed from the direction D1, a contact area between the first resin member 14 and the second resin member 17 can be reduced. Therefore, in a case where the first resin member 14 and the second resin member 17 are thermally shrunk or thermally expanded due to a change in environmental temperature, it is possible to suppress occurrence of damage at a contact portion between the first resin member 14 and the second resin member 17.

A light transmittance of the second resin member 17 is lower than a light transmittance of the first resin member 14. Thereby, noise light from the side toward the light receiving element 12 can be blocked by the second resin member 17 while suppressing light from the FOP 13 toward the light receiving element 12 from being blocked by the first resin member 14. As a result, the detection accuracy can be improved.

The second resin member 17 is harder than the first resin member 14. Thereby, the FOP 13 and the light receiving element 12 can be more reliably supported by the second resin member 17 while suppressing the occurrence of peeling between the FOP 13 and the light receiving element 12 bonded by the first resin member 14. As a result, the FOP 13 can be stably disposed on the light receiving element 12.

The optical module 6 includes the anti-reflective layer 15 formed on the input surface 13*a* of the FOP 13. In this case, reflection of light on the input surface 13*a* of the FOP 13 can be suppressed, and detection accuracy can be improved.

The FOP 13 has the pair of side surfaces 13*c* and 13*d* facing opposite sides to each other in the direction D2, and the second resin member 17 is in contact with both of the pair of side surfaces 13*c* and 13*d*. Thereby, the light receiving element 12 and the FOP 13 can be more reliably supported.

In the method for manufacturing an optical module for an encoder according to an embodiment, after the second step of bonding the FOP 13 to the light receiving element 12 by the first resin member 14, the third step of disposing the second resin member 17 on the surface 18*a* of the bottom wall part 18 so as to be in contact with the light receiving element 12, the first resin member 14, and the FOP 13 is performed. Thereby, displacement of the position of the FOP 13 with respect to the light receiving element 12 at the time of manufacturing can be suppressed, and a decrease in yield can be suppressed. That is, for example, in a case where the light receiving element 12 and the FOP 13 are also bonded by the second resin member 17 with the first resin member 14 omitted (in a case where the first resin member 14 and the second resin member 17 are composed of one resin member), it takes a relatively long time for the second resin member 17 to be cured, and thus, the position of the FOP 13 may be shifted until the second resin member 17 is cured. On the other hand, in the method for manufacturing an optical module according to an embodiment, since the second resin member 17 is disposed on the surface 18*a* of the bottom wall part 18 after the FOP 13 is bonded to the light receiving element 12 by the first resin member 14, such positional displacement of the FOP 13 can be suppressed, and the yield can be improved.

The viscosity of the first resin member 14 before being cured in the second step is lower than the viscosity of the second resin member 17 before being cured in the third step. Thereby, since the viscosity of the first resin member 14 before being cured is low, generation of air bubbles and the like in the first resin member 14 after being cured can be suppressed, and the FOP 13 can be stably disposed on the light receiving element 12. Furthermore, since the viscosity of the second resin member 17 before being cured is high, a configuration for blocking the second resin member 17 before being cured (for example, a side wall part) can be omitted, and the manufacturing efficiency can be improved. Further, since it is not necessary to dispose a configuration for blocking the second resin member 17 on the bottom wall part 18, the area of the bottom wall part 18 can be reduced, and a greater number of optical modules 6 can be manufactured from one substrate 20.

The forming step of forming the FOP 13 includes, in the stated order, a step of attaching the substrate 40 having a plurality of portions 41 corresponding to the first resin member 14 to the substrate 30 having a plurality of portions 31 corresponding to the FOP 13, and a step of cutting the substrate 30 and the substrate 40 to acquire a plurality of the FOPs 13 attached with the first resin member 14. Thereby, for example, the manufacturing efficiency can be improved as compared with a case where the first resin member 14 is individually attached to the plurality of the FOPs 13.

In the first step, for each of the plurality of bottom wall portions 21, the light receiving element 12 is disposed on the surface 18*a* of the bottom wall part 18 such that the light receiving surface 121*a* faces a side opposite to the bottom wall part 18. In the second step, for each of the plurality of bottom wall portions 21, the FOP 13 is disposed on the light receiving element 12 such that the output surface 13*b* faces the light receiving surface 121*a*, and the FOP 13 is bonded to the light receiving element 12 by the first resin member 14 disposed between the light receiving surface 121*a* and the output surface 13*b*. In the third step, for each of the plurality of bottom wall portions 21, the second resin member 17 is disposed on the surface 18*a* of the bottom wall part 18 so as to be in contact with the light receiving element 12, the first resin member 14, and the FOP 13. After the third step, the substrate 20 is cut to acquire a plurality of the optical modules 6. Thereby, for example, the manufacturing efficiency can be improved as compared with a case where the light receiving element 12 and the like are individually disposed on the plurality of singulated bottom wall parts 18.

In the third step, the second resin member 17 is disposed on the surface 18*a* of the bottom wall part 18 such that the second resin member 17 is separated from the boundary L1 between the plurality of bottom wall portions 21. Thereby, since it is not necessary to provide a configuration for blocking the second resin member 17 before being cured (for example, a side wall part) on the boundary L1, the manufacturing efficiency can be improved.

[Modifications]

Figure 6:
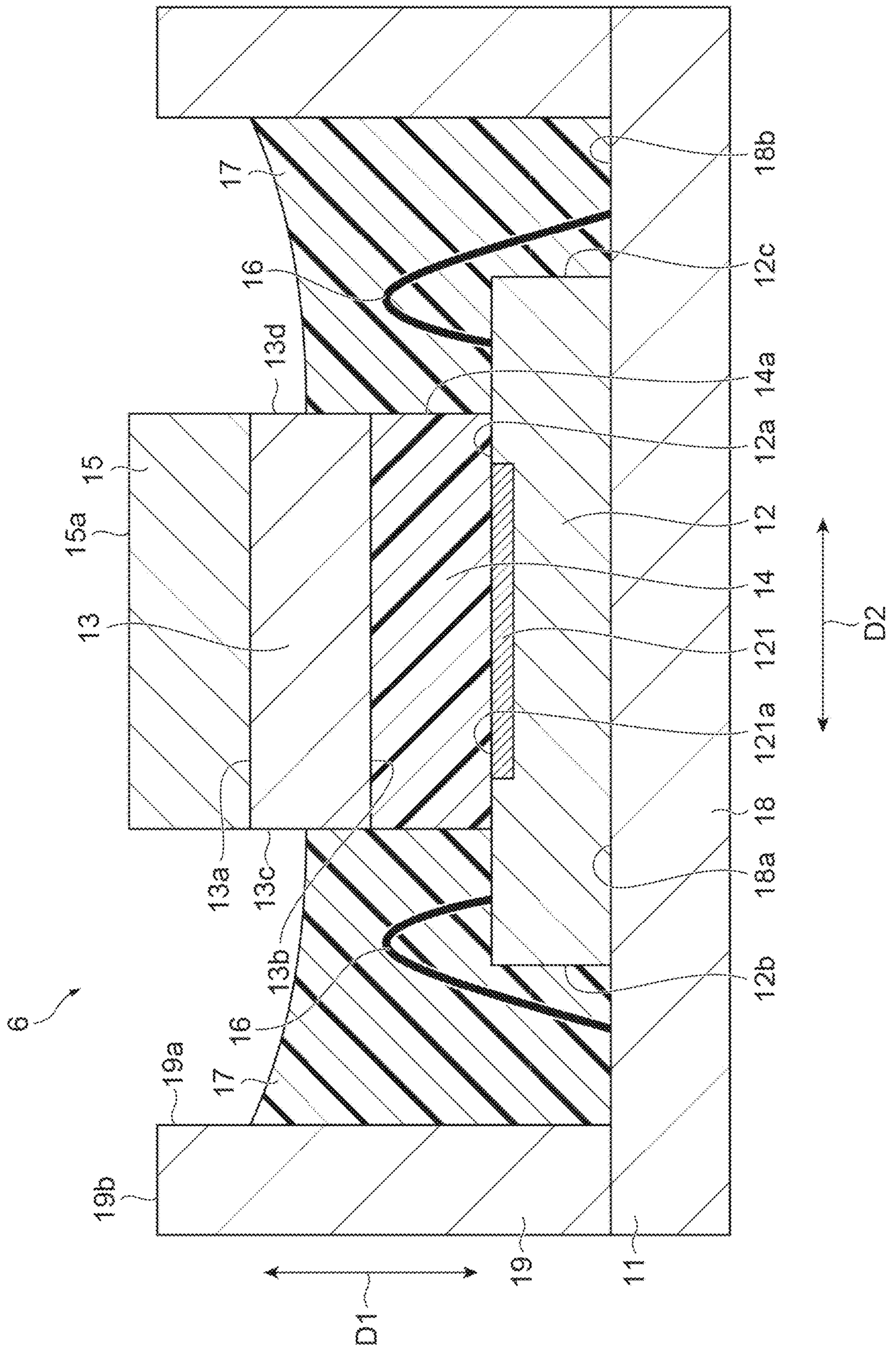
FIG. 6 is a cross-sectional view of an optical module according to a modification.

The optical module 6 may be configured as in a modification illustrated in FIG. 6. In the modification, the support 11 further has the side wall part 19 disposed on the surface 18*a* of the bottom wall part 18. The side wall part 19 is formed along the outer edge of the surface 18*a*, and has a rectangular frame shape when viewed from the direction D1. The side wall part 19 surrounds the light receiving element 12, the FOP 13, the first resin member 14, the anti-reflective layer 15, the wire 16, and the second resin member 17 when viewed from the direction D1. The side wall part 19 may be formed of the same material as the bottom wall part 18 (for example, a glass epoxy resin). In the present modification, the second resin member 17 is in contact with an inner surface 19*a* of the side wall part 19 and is not in contact with an end surface 19*b* of the side wall part 19 on a side opposite to the bottom wall part 18.

According to such a modification as well, similarly to the above-described embodiment, a design according to required performance can be realized. Furthermore, in the modification, the support 11 further has the side wall part 19 disposed on the surface 18*a* of the bottom wall part 18, the side wall part 19 surrounds the light receiving element 12 and the second resin member 17 when viewed from the direction D1, and the second resin member 17 is in contact with the side wall part 19. In this case, at the time of manufacturing the optical module 6, the second resin member 17 before being cured can be blocked by the side wall part 19. Therefore, a material having a low viscosity can be used as a material for the second resin member 17, and the degree of freedom in material selection of the first resin member 14 and the second resin member 17 can be further increased. Furthermore, the light receiving element 12 can be protected from physical contact by the side wall part 19.

The present disclosure is not limited to the above embodiment and modifications. For example, the material and shape of each configuration are not limited to the material and shape described above, and various materials and shapes can be adopted. For example, the first resin member 14 may be formed by curing the resin material melted by heating. When viewed from the direction D1, the outer edge of the first resin member 14 may not overlap the outer edge of the FOP 13. The outer edge of the first resin member 14 may be positioned inside or outside the outer edge of the FOP 13.

The light transmittance of the second resin member 17 may be higher than the light transmittance of the first resin member 14. A hardness of the second resin member 17 may be lower than a hardness of the first resin member 14. The viscosity of the first resin member 14 heated in the second step may be higher than the viscosity of the second resin member 17 heated in the third step.

The second resin member 17 may be disposed over the entire surface 18*a* of the bottom wall part 18. In this case, the peripheral edge part 18*b* of the surface 18*a* may not be exposed from the second resin member 17. The second resin member 17 may not cover the entire wire 16, or may cover only a part of the wire 16. The second resin member 17 may not be in contact with the side wall part 19. In a case where the side wall part 19 is disposed on the bottom wall part 18, an inner portion adjacent to the side wall part 19 of the surface 18*a* of the bottom wall part 18 is the peripheral edge part 18*b* of the surface 18*a*, and the peripheral edge part 18*b* may be exposed from the second resin member 17.

In the method for manufacturing the optical module 6 according to the above embodiment, after the substrate 20 is cut to acquire a plurality of the bottom wall parts 18, the light receiving element 12 may be disposed on the surface 18*a* of each bottom wall part 18. After the substrate 30 is cut to acquire a plurality of the FOPs 13, the first resin member 14 and the anti-reflective layer 15 may be disposed on each FOP 13.

In the above embodiment, after the first resin member 14 is attached onto the output surface 13*b* of the FOP 13, the FOP 13 to which the first resin member 14 is attached is disposed on the light receiving surface 121*a* of the light receiving element 12; however, the FOP 13 may be disposed on the first resin member 14 after the first resin member 14 is disposed on (attached to) the light receiving surface 121*a*.

The encoder 1 may be a reflection-type encoder. In this case, the light source 5 is disposed on the same side as the optical module 6 with respect to the rotary plate 3. The light source 5 may be disposed on, for example, the surface 18*a* of the bottom wall part 18. That is, the optical module 6 may include a light emitting element disposed on the surface 18*a* of the bottom wall part 18. The rotary plate 3 may have a light reflection pattern that reflects the light emitted from the light source 5 instead of the light passage pattern 3*a*. In this case, the light emitted from the light source 5 is reflected by the light reflection pattern of the rotary plate 3 and then is incident on the light receiving element 12.

The number of light receiving parts 121 (light receiving surfaces 121*a*) included in the light receiving element 12 is not limited, and may be one or more. The light receiving element 12 may be connected to the wiring of the bottom wall part 18 via a bump instead of the wire 16. The anti-reflective layer 15 may be formed only on a part of the input surface 13*a* or may be omitted. The first resin material and the second resin material may be the same as each other.

REFERENCE SIGNS LIST

1 encoder
3 rotary plate
3*a* light passage pattern
5 light source
6 optical module (optical module for encoder)
11 support
12 light receiving element
121*a* light receiving surface
13 FOP (fiber optical plate)
13*a* input surface

13*b* output surface
13*c*, 13*d* side surface
14 first resin member
15 anti-reflective layer
16 wire
17 second resin member
18 bottom wall part
18*a* surface
18*b* peripheral edge part
19 side wall part
20 substrate (third substrate)
21 bottom wall portion
30 substrate (first substrate)
31 portion
40 substrate (second substrate)
41 portion
L1 boundary

The invention claimed is:

1. An optical module for an encoder comprising:

a support including a bottom wall part;

a light receiving element including a light receiving surface and disposed on a surface of the bottom wall part with the light receiving surface facing a side opposite to the bottom wall part;

a fiber optical plate including an input surface constituted by surfaces of one end of a plurality of optical fibers and an output surface constituted by surfaces of the other end of the plurality of optical fibers and disposed on the light receiving element with the output surface facing the light receiving surface;

a first resin member disposed between the light receiving surface and the output surface and configured to bond the fiber optical plate to the light receiving element; and a second resin member disposed on the surface of the bottom wall part so as to be in contact with the light receiving element and the fiber optical plate, wherein a material for the first resin member and a material for the second resin member are different from each other, and the first resin member is in contact with the light receiving surface and the output surface.

2. The optical module for an encoder according to claim 1, further comprising a wire connected to the bottom wall part and the light receiving element, wherein the second resin member covers the wire.

3. The optical module for an encoder according to claim 1, wherein a peripheral edge part of the surface of the bottom wall part is exposed from the second resin member.

4. The optical module for an encoder according to claim 1, wherein the support further includes a side wall part disposed on the surface of the bottom wall part, the side wall part surrounds the light receiving element and the second resin member when viewed from a thickness direction of the bottom wall part, and the second resin member is in contact with the side wall part.

5. The optical module for an encoder according to claim 1, wherein the first resin member is an adhesive film.

6. The optical module for an encoder according to claim 1, wherein the first resin member is a die attach film.

7. The optical module for an encoder according to claim 1, wherein an outer edge of the first resin member overlaps an outer edge of the fiber optical plate when viewed from a thickness direction of the bottom wall part.

8. The optical module for an encoder according to claim 1, wherein a light transmittance of the second resin member is lower than a light transmittance of the first resin member.

9. The optical module for an encoder according to claim 1, wherein the second resin member is harder than the first resin member.

10. The optical module for an encoder according to claim 1, further comprising an anti-reflective layer formed on the input surface of the fiber optical plate.

11. The optical module for an encoder according to claim 1, wherein the fiber optical plate includes a pair of side surfaces facing opposite sides to each other in a direction perpendicular to a thickness direction of the bottom wall part, and the second resin member is in contact with both of the pair of side surfaces.

12. An encoder comprising:

a rotary plate including a light passage pattern or a light reflection pattern; and the optical module for an encoder according to claim 1 disposed with light passing through the light passage pattern or light reflected by the light reflection pattern being incident on the light receiving element.

13. A method for manufacturing an optical module for an encoder including a support including a bottom wall part, a light receiving element including a light receiving surface, a fiber optical plate including an input surface constituted by surfaces of one end of a plurality of optical fibers and an output surface constituted by surfaces of the other end of the plurality of optical fibers, a first resin member configured to bond the fiber optical plate to the light receiving element, and a second resin member disposed on a surface of the bottom wall part, the method comprising, in the stated order:

a first step of disposing the light receiving element on the surface of the bottom wall part with the light receiving surface facing a side opposite to the bottom wall part;

a second step of disposing the fiber optical plate on the light receiving element with the output surface facing the light receiving surface and bonding the fiber optical plate to the light receiving element by the first resin member disposed between the light receiving surface and the output surface; and a third step of disposing the second resin member on the surface of the bottom wall part so as to be in contact with the light receiving element and the fiber optical plate, wherein a material for the first resin member and a material for the second resin member are different from each other, and the first resin member is in contact with the light receiving surface and the output surface.

14. The method for manufacturing an optical module for an encoder according to claim 13, wherein the first resin member is an adhesive film.

15. The method for manufacturing an optical module for an encoder according to claim 13, wherein the first resin member is a die attach film.

16. The method for manufacturing an optical module for an encoder according to claim 13, wherein in the second step, the fiber optical plate is bonded to the light receiving element by curing the first resin member, in the third step, the second resin member is disposed on the surface of the bottom wall part and then cured, and a viscosity of the first resin member before being cured in the second step is lower than a viscosity of the second resin member before being cured in the third step.

17. The method for manufacturing an optical module for an encoder according to claim 13, further comprising a forming step of forming the fiber optical plate before the second step, wherein the forming step includes, in the stated order:

a step of attaching a second substrate including a plurality of portions corresponding to the first resin member to a first substrate including a plurality of portions corresponding to the fiber optical plate, and a step of cutting the first substrate and the second substrate to acquire a plurality of the fiber optical plates attached with the first resin member.

18. The method for manufacturing an optical module for an encoder according to claim 13, wherein a third substrate including a plurality of bottom wall portions corresponding to the bottom wall part is used, in the first step, for each of the plurality of bottom wall portions, the light receiving element is disposed on the surface of the bottom wall part with the light receiving surface facing a side opposite to the bottom wall part, in the second step, for each of the plurality of bottom wall portions, the fiber optical plate is disposed on the light receiving element with the output surface facing the light receiving surface and the fiber optical plate is bonded to the light receiving element by the first resin member disposed between the light receiving surface and the output surface, in the third step, for each of the plurality of bottom wall portions, the second resin member is disposed on the surface of the bottom wall part so as to be in contact with the light receiving element, the first resin member, and the fiber optical plate, and the method for manufacturing an optical module for an encoder further comprises a fourth step of cutting the third substrate to acquire a plurality of the optical modules for an encoder after the third step.

19. The method for manufacturing an optical module for an encoder according to claim 18, wherein in the third step, the second resin member is disposed on the surface of the bottom wall part with the second resin member being separated from a boundary between the plurality of bottom wall portions.

20. An optical module for an encoder comprising:

a support including a bottom wall part;

a light receiving element including a light receiving surface and disposed on a surface of the bottom wall part with the light receiving surface facing a side opposite to the bottom wall part;

a fiber optical plate including an input surface constituted by surfaces of one end of a plurality of optical fibers and an output surface constituted by surfaces of the other end of the plurality of optical fibers and disposed on the light receiving element with the output surface facing the light receiving surface;

a first resin member disposed between the light receiving surface and the output surface and configured to bond the fiber optical plate to the light receiving element; and a second resin member disposed on the surface of the bottom wall part so as to be in contact with the light receiving element and the fiber optical plate, wherein a material for the first resin member and a material for the second resin member are different from each other, the support further includes a side wall part disposed on the surface of the bottom wall part, the side wall part surrounds the light receiving element and the second resin member when viewed from a thickness direction of the bottom wall part, and the second resin member is in contact with the side wall part.

21. An optical module for an encoder comprising:

a support including a bottom wall part;

a light receiving element including a light receiving surface and disposed on a surface of the bottom wall part with the light receiving surface facing a side opposite to the bottom wall part;

a fiber optical plate including an input surface constituted by surfaces of one end of a plurality of optical fibers and an output surface constituted by surfaces of the other end of the plurality of optical fibers and disposed on the light receiving element with the output surface facing the light receiving surface;

a first resin member disposed between the light receiving surface and the output surface and configured to bond the fiber optical plate to the light receiving element; and a second resin member disposed on the surface of the bottom wall part so as to be in contact with the light receiving element and the fiber optical plate, wherein a material for the first resin member and a material for the second resin member are different from each other, and an outer edge of the first resin member overlaps an outer edge of the fiber optical plate when viewed from a thickness direction of the bottom wall part.

22. An optical module for an encoder comprising:

a support including a bottom wall part;

a light receiving element including a light receiving surface and disposed on a surface of the bottom wall part with the light receiving surface facing a side opposite to the bottom wall part;

a fiber optical plate including an input surface constituted by surfaces of one end of a plurality of optical fibers and an output surface constituted by surfaces of the other end of the plurality of optical fibers and disposed on the light receiving element with the output surface facing the light receiving surface;

a first resin member disposed between the light receiving surface and the output surface and configured to bond the fiber optical plate to the light receiving element; and a second resin member disposed on the surface of the bottom wall part so as to be in contact with the light receiving element and the fiber optical plate, wherein a material for the first resin member and a material for the second resin member are different from each other, and a light transmittance of the second resin member is lower than a light transmittance of the first resin member.

23. An optical module for an encoder comprising:

a support including a bottom wall part;

a light receiving element including a light receiving surface and disposed on a surface of the bottom wall part with the light receiving surface facing a side opposite to the bottom wall part;

a fiber optical plate including an input surface constituted by surfaces of one end of a plurality of optical fibers and an output surface constituted by surfaces of the other end of the plurality of optical fibers and disposed on the light receiving element with the output surface facing the light receiving surface;

an anti-reflective layer formed on the input surface of the fiber optical plate;

a first resin member disposed between the light receiving surface and the output surface and configured to bond the fiber optical plate to the light receiving element; and a second resin member disposed on the surface of the bottom wall part so as to be in contact with the light receiving element and the fiber optical plate, wherein a material for the first resin member and a material for the second resin member are different from each other.

24. An optical module for an encoder comprising:

a support including a bottom wall part;

a light receiving element including a light receiving surface and disposed on a surface of the bottom wall part with the light receiving surface facing a side opposite to the bottom wall part;

a fiber optical plate including an input surface constituted by surfaces of one end of a plurality of optical fibers and an output surface constituted by surfaces of the other end of the plurality of optical fibers and disposed on the light receiving element with the output surface facing the light receiving surface;

a first resin member disposed between the light receiving surface and the output surface and configured to bond the fiber optical plate to the light receiving element; and a second resin member disposed on the surface of the bottom wall part so as to be in contact with the light receiving element and the fiber optical plate, wherein a material for the first resin member and a material for the second resin member are different from each other, the fiber optical plate includes a pair of side surfaces facing opposite sides to each other in a direction perpendicular to a thickness direction of the bottom wall part, and the second resin member is in contact with both of the pair of side surfaces.

25. An encoder comprising:

a rotary plate including a light passage pattern or a light reflection pattern; and an optical module comprising:

a support including a bottom wall part;

a light receiving element including a light receiving surface and disposed on a surface of the bottom wall part with the light receiving surface facing a side opposite to the bottom wall part;

a fiber optical plate including an input surface constituted by surfaces of one end of a plurality of optical fibers and an output surface constituted by surfaces of the other end of the plurality of optical fibers and disposed on the light receiving element with the output surface facing the light receiving surface;

a first resin member disposed between the light receiving surface and the output surface and configured to bond the fiber optical plate to the light receiving element; and a second resin member disposed on the surface of the bottom wall part so as to be in contact with the light receiving element and the fiber optical plate, wherein a material for the first resin member and a material for the second resin member are different from each other, and the optical module is disposed with light passing through the light passage pattern or light reflected by the light reflection pattern being incident on the light receiving element.

26. A method for manufacturing an optical module for an encoder including a support including a bottom wall part, a light receiving element including a light receiving surface, a fiber optical plate including an input surface constituted by surfaces of one end of a plurality of optical fibers and an output surface constituted by surfaces of the other end of the plurality of optical fibers, a first resin member configured to bond the fiber optical plate to the light receiving element, and a second resin member disposed on a surface of the bottom wall part, the method comprising, in the stated order:

a first step of disposing the light receiving element on the surface of the bottom wall part with the light receiving surface facing a side opposite to the bottom wall part;

a second step of disposing the fiber optical plate on the light receiving element with the output surface facing the light receiving surface and bonding the fiber optical plate to the light receiving element by the first resin member disposed between the light receiving surface and the output surface; and a third step of disposing the second resin member on the surface of the bottom wall part so as to be in contact with the light receiving element and the fiber optical plate, wherein a material for the first resin member and a material for the second resin member are different from each other, in the second step, the fiber optical plate is bonded to the light receiving element by curing the first resin member, in the third step, the second resin member is disposed on the surface of the bottom wall part and then cured, and a viscosity of the first resin member before being cured in the second step is lower than a viscosity of the second resin member before being cured in the third step.

27. A method for manufacturing an optical module for an encoder including a support including a bottom wall part, a light receiving element including a light receiving surface, a fiber optical plate including an input surface constituted by surfaces of one end of a plurality of optical fibers and an output surface constituted by surfaces of the other end of the plurality of optical fibers, a first resin member configured to bond the fiber optical plate to the light receiving element, and a second resin member disposed on a surface of the bottom wall part, the method comprising, in the stated order:

a first step of disposing the light receiving element on the surface of the bottom wall part with the light receiving surface facing a side opposite to the bottom wall part;

a second step of disposing the fiber optical plate on the light receiving element with the output surface facing the light receiving surface and bonding the fiber optical plate to the light receiving element by the first resin member disposed between the light receiving surface and the output surface; and a third step of disposing the second resin member on the surface of the bottom wall part so as to be in contact with the light receiving element and the fiber optical plate, wherein a material for the first resin member and a material for the second resin member are different from each other, the method further comprising a forming step of forming the fiber optical plate before the second step, wherein the forming step includes, in the stated order:

a step of attaching a second substrate including a plurality of portions corresponding to the first resin member to a first substrate including a plurality of portions corresponding to the fiber optical plate, and a step of cutting the first substrate and the second substrate to acquire a plurality of the fiber optical plates attached with the first resin member.

28. A method for manufacturing an optical module for an encoder including a support including a bottom wall part, a light receiving element including a light receiving surface, a fiber optical plate including an input surface constituted by surfaces of one end of a plurality of optical fibers and an output surface constituted by surfaces of the other end of the plurality of optical fibers, a first resin member configured to bond the fiber optical plate to the light receiving element, and a second resin member disposed on a surface of the bottom wall part, the method comprising, in the stated order:

a first step of disposing the light receiving element on the surface of the bottom wall part with the light receiving surface facing a side opposite to the bottom wall part;

a second step of disposing the fiber optical plate on the light receiving element with the output surface facing the light receiving surface and bonding the fiber optical plate to the light receiving element by the first resin member disposed between the light receiving surface and the output surface; and a third step of disposing the second resin member on the surface of the bottom wall part so as to be in contact with the light receiving element and the fiber optical plate, wherein a material for the first resin member and a material for the second resin member are different from each other, a third substrate including a plurality of bottom wall portions corresponding to the bottom wall part is used, in the first step, for each of the plurality of bottom wall portions, the light receiving element is disposed on the surface of the bottom wall part with the light receiving surface facing a side opposite to the bottom wall part, in the second step, for each of the plurality of bottom wall portions, the fiber optical plate is disposed on the light receiving element with the output surface facing the light receiving surface and the fiber optical plate is bonded to the light receiving element by the first resin member disposed between the light receiving surface and the output surface, in the third step, for each of the plurality of bottom wall portions, the second resin member is disposed on the surface of the bottom wall part so as to be in contact with the light receiving element, the first resin member, and the fiber optical plate, and the method for manufacturing an optical module for an encoder further comprises a fourth step of cutting the third substrate to acquire a plurality of the optical modules for an encoder after the third step.

* * * * *